US 012494899B2

(12) United States Patent
Aggarwal et al.

(10) Patent No.: US 12,494,899 B2
(45) Date of Patent: Dec. 9, 2025

(54) APPARATUS, METHODS, AND COMPUTER PROGRAMS FOR PROTECTING SENSITIVE DATA

(71) Applicant: Nokia Technologies Oy, Espoo (FI)

(72) Inventors: Chaitanya Aggarwal, Munich (DE); Saurabh Khare, Bangalore (IN); German Peinado Gomez, Warsaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 251 days.

(21) Appl. No.: 18/312,627

(22) Filed: May 5, 2023

(65) Prior Publication Data
US 2023/0361989 A1    Nov. 9, 2023

(30) Foreign Application Priority Data

May 6, 2022  (IN) .............................. 202241026450

(51) Int. Cl.
| | | |
|---|---|---|
| *H04L 9/08* | (2006.01) | |
| *G06F 21/62* | (2013.01) | |
| *H04L 9/32* | (2006.01) | |

(52) U.S. Cl.
CPC ........ *H04L 9/0822* (2013.01); *G06F 21/6209* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 9,692,789 B2 | 6/2017 | Kirti et al. | |
| 11,188,785 B2 | 11/2021 | Lee et al. | |
| 2002/0002047 A1* | 1/2002 | Fujiwara | ................ H04L 67/62 |
| | | | 455/557 |

(Continued)

FOREIGN PATENT DOCUMENTS

| | | |
|---|---|---|
| WO | 2021/018460 A1 | 2/2021 |
| WO | 2021/136601 A1 | 7/2021 |

OTHER PUBLICATIONS

"3rd Generation Partnership Project; Technical Specification Group Services and System Aspects; Security architecture and procedures for 5G system (Release 17)", 3GPP TS 33.501, V17.5.0, Mar. 2022, pp. 1-293.

(Continued)

*Primary Examiner* — William J. Goodchild
(74) *Attorney, Agent, or Firm* — SQUIRE PATTON BOGGS (US) LLP

(57) ABSTRACT

There is provided a method, computer program, and an apparatus for a network function service consumer, that causes the apparatus to perform: retrieving, from a first repository function, protected sensitive data; retrieving, from a second network function, at least one encrypted key; decrypting the retrieved at least one encrypted key using a private key associated with the network function service consumer to obtain a respective at least one key; and performing at least one of: decryption of the protected sensitive data using the at least one key to obtain sensitive data or integrity protected sensitive data; or verification of the integrity of the protected sensitive data using the at least one key.

19 Claims, 9 Drawing Sheets

(56) References Cited

U.S. PATENT DOCUMENTS

| | | | | |
|---|---|---|---|---|
| 2003/0028773 | A1* | 2/2003 | McGarvey | H04L 63/0823 713/176 |
| 2003/0051129 | A1* | 3/2003 | Razdan | H04L 9/083 713/151 |
| 2007/0136606 | A1* | 6/2007 | Mizuno | H04L 9/0894 713/192 |
| 2009/0276829 | A1* | 11/2009 | Sela | G06F 21/606 711/E12.001 |
| 2010/0099511 | A1* | 4/2010 | Stites | A63B 53/047 473/291 |
| 2016/0072772 | A1* | 3/2016 | Geigel | G06F 21/10 713/164 |
| 2018/0234403 | A1 | 8/2018 | Casella et al. | |
| 2021/0118547 | A1* | 4/2021 | Morris | G16H 50/70 |
| 2022/0053348 | A1 | 2/2022 | Singh et al. | |

OTHER PUBLICATIONS

"3rd Generation Partnership Project; Technical Specification Group Services and System Aspects; Architecture enhancements for 5G System (5GS) to support network data analytics services (Release 17)", 3GPP TS 23.288, V17.4.0, Mar. 2022, pp. 1-205.

"3rd Generation Partnership Project; Technical Specification Group Services and System Aspects; Study of Enablers for Network Automation for 5G System (5GS); Phase 3 (Release 18)", 3GPP TR 23.700-81, V0.1.0, Mar. 2022, pp. 1-14.

"3rd Generation Partnership Project; Technical Specification Group Core Network and Terminals; 5G System; Technical Realization of Service Based Architecture; Stage 3 (Release 17)", 3GPP TS 29.500, V17.6.0, Mar. 2022, pp. 1-126.

"3rd Generation Partnership Project; Technical Specification Group Core Network and Terminals; 5G System; Network Function Repository Services; Stage 3 (Release 17)", 3GPP TS 29.510, V17.5.0, Mar. 2022, pp. 1-298.

"3rd Generation Partnership Project; Technical Specification Group Services and System Aspects; Study on security aspects of enablers for Network Automation for 5G—phase 3; (Release 18)", 3GPP TR 33.738, V1.0.0, Mar. 2022, 69 pages.

"Resolution of EN related to encryption in KI#3 conclusion in eNA_SEC_Ph3", 3GPP TSG-SA3 Meeting #110Ad-Hoc-e, S3-232151, Agenda: 5.8, Nokia, Apr. 17-21, 2023, 2 pages.

Extended European Search Report received for corresponding European Patent Application No. 23171746.3, dated Sep. 29, 2023, 11 pages.

Seitz et al., "Key Management for Encrypted Data Storage in Distributed Systems", Second IEEE International Security in Storage Workshop, Oct. 31, 2003, 11 pages.

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V17.0.0, Dec. 2021, pp. 1-51.

"Update on the Solution #5: Providing the Security protection of data via Messaging Framework", 3GPP TSG-SA3 Meeting #104-e, S3-213154, Agenda: 5.16, Ericsson, Aug. 16-27, 2021, 4 pages.

* cited by examiner

APPARATUS, METHODS, AND COMPUTER PROGRAMS FOR PROTECTING SENSITIVE DATA

FIELD

Various examples described herein generally relate to apparatus, methods, and computer programs, and more particularly (but not exclusively) to apparatus, methods and computer programs for network apparatuses.

BACKGROUND

In general, a communication system can be seen as a facility that enables communication sessions between two or more entities such as user terminals, access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture is the long-term evolution (LTE) or the Universal Mobile Telecommunications System (UMTS) radio-access technology. Another example communication system is so called 5G system that allows user equipment (UE) or user device to contact a 5G core (5GC) via e.g. new radio (NR) access technology or via other access technology such as Untrusted access to 5GC or wireline access technology.

In 5G, a UE Registration Area (RA) comprises a list of one or more Tracking Areas (TA). A Tracking Area is a logical concept of an area where a UE can move around without updating the network. The network can allocate a list with one or more TAs to the UE.

SUMMARY

According to a first aspect, there is provided an apparatus for a network function service consumer, the apparatus comprising means for performing: retrieving, from a first repository function, protected sensitive data; retrieving, from a second network function, at least one encrypted key; decrypting the retrieved at least one encrypted key using a private key associated with the network function service consumer to obtain a respective at least one key; and performing at least one of: decryption of the protected sensitive data using the at least one key to obtain sensitive data or integrity protected sensitive data; or verification of the integrity of the protected sensitive data using the at least one key.

The means may be further configured to perform: obtaining, from a network repository function, an access token for authorising the apparatus to have access to the protected sensitive data; providing the access token to the first repository function as part of a service request for the protected sensitive data; and receiving the protected sensitive data in response to said providing.

The receiving the protected sensitive data may comprise: receiving an address from which the protected sensitive data may be downloaded; and downloading the protected sensitive data from the address.

The means may be further configured to perform: receiving, from the first repository function, at least one of: an indication that the protected sensitive data is encrypted; an indication that the second network function comprises a key for decrypting the protected sensitive data; an indication that the protected sensitive data is integrity protected; or an indication that the second network function comprises a key and/or metadata associated with verifying the protected sensitive data.

The means may be further configured to perform: signalling, to a network repository function, a request for the access token; wherein the request comprises an indication that the apparatus is configured to decrypt and/or verify protected sensitive data, and either a public key or an indication of where to obtain the public key; and wherein the public key is a public key of the network function service consumer to be used for encrypting the at least one key.

The indication of where to obtain the public key may comprise one of the following: from a transport layer security, TLS, certificate; or from a client credentials assertion, CCA.

The second network function may be a network repository function.

The second network function may be a network function service producer and/or a network analytics data function.

The at least one encrypted key may comprise at least one of: an encrypted first key for decrypting the protected sensitive data; or an encrypted second key for integrity verification of the protected sensitive data.

The protected sensitive data may comprise sensitive data and an expected message authentication code, XMAC, value and the at least one key may comprise an integrity protection key, and the verification of the integrity of the protected sensitive data using the at least one key comprises performing: computing a message authentication code, MAC, value on the sensitive data by inputting the integrity protection key and the sensitive data to a keyed hash function to output the MAC value; comparing the MAC value to the XMAC value; and determining that the sensitive data is successfully verified when the MAC and XMAC values are the same.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a second aspect, there is provided an apparatus for a network function service producer, the apparatus comprising means for: protecting sensitive data using at least one key to form protected sensitive data; registering the protected sensitive data at a first repository function; and providing the at least one key to a network function.

The providing the at least one key to a network function may comprise providing the at least one key to a network repository function.

The providing the at least one key to a network function may comprise: receiving a request for the at least one key from a network function service consumer; encrypting the at least one key using a public key associated with the network function service consumer to form at least one encrypted key; and providing the at least one encrypted key to the network function service consumer.

The request for the at least one key may comprise the public key or an indication of where to obtain the public key.

The indication of where to obtain the public key may comprise an indication of one of the following: from a transport layer security, TLS, certificate; or from a client credentials assertion, CCA.

The at least one encrypted key may comprise at least one of: an encrypted first key for decrypting the protected sensitive data; or an encrypted second key for integrity verification of the protected sensitive data.

The means may be further configured to perform: registering a profile for the network function service producer at a network repository function, wherein the profile comprises an indication that the network function service producer is able to provide the at least one key to the network function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The means may be further configured for performing integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The means may be further configured for performing encryption on the integrity protected sensitive data by: using a symmetric encryption function with the encryption key on the integrity protected sensitive data to obtain the integrity protected and encrypted sensitive data.

The means may be further configured for performing encryption on sensitive data by: using a symmetric encryption function with the encryption key on the sensitive data to obtain encrypted sensitive data.

According to a third aspect, there is provided an apparatus for a network repository function, the apparatus comprising means for performing: storing profile information for a first network function service producer, wherein the profile comprises an indication that the first network function service producer is able to provide at least one first key associated with verifying and/or decrypting a first protected sensitive data to another network function; receiving, from a first network function service consumer, a request for a first access token for enabling the first network function service consumer to obtain the at least one first key; and providing the first network function service consumer with the requested access token.

The means may be further configured to perform: receiving, from a second network function service producer, at least one second key associated with verifying and/or decrypting a second protected sensitive data; receiving, from a second network function service consumer, a request for a second access token for accessing the second protected sensitive data; wherein the request for the second access token comprises an indication that the second network function service consumer is configured to decrypt and/or verify protected sensitive data, and either a public key or an indication of where to obtain the public key; and wherein the public key is a public key of the second network function service consumer; encrypting the at least one second key using the public key to form at least one encrypted second key; and providing the at least one encrypted second key to the network function service consumer.

The at least one encrypted second key may be provided as part of an access token claim in response to the request for the access token.

The at least one encrypted second key may comprise at least one of: an encrypted key for decrypting the protected sensitive data; or an encrypted key for integrity verification of the protected sensitive data.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a fourth aspect, there is provided an apparatus for a first repository function, the apparatus comprising means for performing: storing protected sensitive data received from a network function service producer; and providing the protected sensitive data to a network function service consumer.

The means may be further configured to perform: receiving an indication from the network function service producer that the protected sensitive data is encrypted and/or integrity protected, and an indication of at least one entity that possesses at least one key associated with verifying and/or decrypting the protected sensitive data; and providing said indications to the network function service consumer.

The providing the protected sensitive data to a network function service consumer may comprise signalling an address from which the protected sensitive data may be downloaded.

The first repository function may be an analytics data repository function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The means may be further configured for performing integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The means may be further configured for performing encryption on the integrity protected sensitive data by: using a symmetric encryption function with the encryption key on the integrity protected sensitive data to obtain the integrity protected and encrypted sensitive data.

The means may be further configured for performing encryption on sensitive data by: using a symmetric encryption function with the encryption key on the sensitive data to obtain encrypted sensitive data.

According to a fifth aspect, there is provided an apparatus for a network function service consumer, the apparatus comprising: at least one processor; and at least one memory comprising code that, when executed by the at least one processor, causes the apparatus to: retrieve, from a first repository function, protected sensitive data; retrieve, from a second network function, at least one encrypted key; decrypt the retrieved at least one encrypted key using a private key associated with the network function service consumer to obtain a respective at least one key; and perform at least one of: decryption of the protected sensitive data using the at least one key to obtain sensitive data or integrity protected sensitive data; or verification of the integrity of the protected sensitive data using the at least one key.

The apparatus may be further caused to perform: obtaining, from a network repository function, an access token for authorising the apparatus to have access to the protected sensitive data; providing the access token to the first repository function as part of a service request for the protected sensitive data; and receiving the protected sensitive data in response to said providing.

The receiving the protected sensitive data may comprise: receiving an address from which the protected sensitive data may be downloaded; and downloading the protected sensitive data from the address.

The apparatus may be further caused to perform: receiving, from the first repository function, at least one of: an indication that the protected sensitive data is encrypted; an indication that the second network function comprises a key for decrypting the protected sensitive data; an indication that the protected sensitive data is integrity protected; or an indication that the second network function comprises a key and/or metadata associated with verifying the protected sensitive data.

The apparatus may be further caused to perform: signalling, to a network repository function, a request for the access token; wherein the request comprises an indication that the apparatus is configured to decrypt and/or verify protected sensitive data, and either a public key or an indication of where to obtain the public key; and wherein the public key is a public key of the network function service consumer to be used for encrypting the at least one key.

The indication of where to obtain the public key may comprise one of the following: from a transport layer security, TLS, certificate; or from a client credentials assertion, CCA.

The second network function may be a network repository function.

The second network function may be a network function service producer and/or a network analytics data function.

The at least one encrypted key may comprise at least one of: an encrypted first key for decrypting the protected sensitive data; or an encrypted second key for integrity verification of the protected sensitive data.

The protected sensitive data may comprise sensitive data and an expected message authentication code, XMAC, value and the at least one key may comprise an integrity protection key, and the verification of the integrity of the protected sensitive data using the at least one key comprises performing: computing a message authentication code, MAC, value on the sensitive data by inputting the integrity protection key and the sensitive data to a keyed hash function to output the MAC value; comparing the MAC value to the XMAC value; and determining that the sensitive data is successfully verified when the MAC and XMAC values are the same.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a sixth aspect, there is provided an apparatus for a network function service producer, the apparatus comprising: at least one processor; and at least one memory comprising code that, when executed by the at least one processor, causes the apparatus to: protect sensitive data using at least one key to form protected sensitive data; register the protected sensitive data at a first repository function; and provide the at least one key to a network function.

The providing the at least one key to a network function may comprise providing the at least one key to a network repository function.

The providing the at least one key to a network function may comprise: receiving a request for the at least one key from a network function service consumer; encrypting the at least one key using a public key associated with the network function service consumer to form at least one encrypted key; and providing the at least one encrypted key to the network function service consumer.

The request for the at least one key may comprise the public key or an indication of where to obtain the public key.

The indication of where to obtain the public key may comprise an indication of one of the following: from a transport layer security, TLS, certificate; or from a client credentials assertion, CCA.

The at least one encrypted key may comprise at least one of: an encrypted first key for decrypting the protected sensitive data; or an encrypted second key for integrity verification of the protected sensitive data.

The apparatus may be further caused to perform: registering a profile for the network function service producer at a network repository function, wherein the profile comprises an indication that the network function service producer is able to provide the at least one key to the network function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The apparatus may be further caused to perform integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The apparatus may be further caused to perform encryption on the integrity protected sensitive data by: using a symmetric encryption function with the encryption key on the integrity protected sensitive data to obtain the integrity protected and encrypted sensitive data.

The apparatus may be further caused to perform encryption on sensitive data by: using a symmetric encryption function with the encryption key on the sensitive data to obtain encrypted sensitive data.

According to a seventh aspect, there is provided an apparatus for a network repository function, the apparatus comprising: at least one processor; and at least one memory comprising code that, when executed by the at least one processor, causes the apparatus to: store profile information for a first network function service producer, wherein the profile comprises an indication that the first network function service producer is able to provide at least one first key associated with verifying and/or decrypting a first protected sensitive data to another network function; receive, from a first network function service consumer, a request for a first access token for enabling the first network function service consumer to obtain the at least one first key; and provide the first network function service consumer with the requested access token.

The apparatus may be further caused to perform: receiving, from a second network function service producer, at least one second key associated with verifying and/or decrypting a second protected sensitive data; receiving, from a second network function service consumer, a request for a second access token for accessing the second protected sensitive data; wherein the request for the second access token comprises an indication that the second network function service consumer is configured to decrypt and/or verify protected sensitive data, and either a public key or an indication of where to obtain the public key; and wherein the public key is a public key of the second network function service consumer; encrypting the at least one second key using the public key to form at least one encrypted second key; and providing the at least one encrypted second key to the network function service consumer.

The at least one encrypted second key may be provided as part of an access token claim in response to the request for the access token.

The at least one encrypted second key may comprise at least one of: an encrypted key for decrypting the protected sensitive data; or an encrypted key for integrity verification of the protected sensitive data.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to an eighth aspect, there is provided an apparatus for a first repository function, the apparatus comprising: at least one processor; and at least one memory comprising code that, when executed by the at least one processor, causes the apparatus to: store protected sensitive data received from a network function service producer; and provide the protected sensitive data to a network function service consumer.

The apparatus may be further caused to perform: receiving an indication from the network function service producer that the protected sensitive data is encrypted and/or integrity protected, and an indication of at least one entity that possesses at least one key associated with verifying and/or decrypting the protected sensitive data; and providing said indications to the network function service consumer.

The providing the protected sensitive data to a network function service consumer may comprise signalling an address from which the protected sensitive data may be downloaded.

The first repository function may be an analytics data repository function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The apparatus may be further caused to perform integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The apparatus may be further caused to perform: encryption on the integrity protected sensitive data by: using a symmetric encryption function with the encryption key on the integrity protected sensitive data to obtain the integrity protected and encrypted sensitive data.

The apparatus may be further caused to perform: encryption on sensitive data by: using a symmetric encryption function with the encryption key on the sensitive data to obtain encrypted sensitive data.

According to a ninth aspect, there is provided a method for an apparatus for a network function service consumer, the method comprising: retrieving, from a first repository function, protected sensitive data; retrieving, from a second network function, at least one encrypted key; decrypting the retrieved at least one encrypted key using a private key associated with the network function service consumer to obtain a respective at least one key; and performing at least one of: decryption of the protected sensitive data using the at least one key to obtain sensitive data or integrity protected sensitive data; or verification of the integrity of the protected sensitive data using the at least one key.

The method may further comprise: obtaining, from a network repository function, an access token for authorising the apparatus to have access to the protected sensitive data; providing the access token to the first repository function as part of a service request for the protected sensitive data; and receiving the protected sensitive data in response to said providing.

The receiving the protected sensitive data may comprise: receiving an address from which the protected sensitive data may be downloaded; and downloading the protected sensitive data from the address.

The method may further comprise: receiving, from the first repository function, at least one of: an indication that the protected sensitive data is encrypted; an indication that the second network function comprises a key for decrypting the protected sensitive data; an indication that the protected sensitive data is integrity protected; or an indication that the second network function comprises a key and/or metadata associated with verifying the protected sensitive data.

The method may further comprise: signalling, to a network repository function, a request for the access token; wherein the request comprises an indication that the apparatus is configured to decrypt and/or verify protected sensitive data, and either a public key or an indication of where to obtain the public key; and wherein the public key is a public key of the network function service consumer to be used for encrypting the at least one key.

The indication of where to obtain the public key may comprise one of the following: from a transport layer security, TLS, certificate; or from a client credentials assertion, CCA.

The second network function may be a network repository function.

The second network function may be a network function service producer and/or a network analytics data function.

The at least one encrypted key may comprise at least one of: an encrypted first key for decrypting the protected sensitive data; or an encrypted second key for integrity verification of the protected sensitive data.

The protected sensitive data may comprise sensitive data and an expected message authentication code, XMAC, value and the at least one key may comprise an integrity protection key, and the verification of the integrity of the protected sensitive data using the at least one key comprises performing: computing a message authentication code, MAC, value on the sensitive data by inputting the integrity protection key and the sensitive data to a keyed hash function to output the MAC value; comparing the MAC value to the XMAC value; and determining that the sensitive data is successfully verified when the MAC and XMAC values are the same.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a tenth aspect, there is provided a method for an apparatus for a network function service producer, the method comprising: protecting sensitive data using at least one key to form protected sensitive data; registering the protected sensitive data at a first repository function; and providing the at least one key to a network function.

The providing the at least one key to a network function may comprise providing the at least one key to a network repository function.

The providing the at least one key to a network function may comprise: receiving a request for the at least one key from a network function service consumer; encrypting the at least one key using a public key associated with the network function service consumer to form at least one encrypted key; and providing the at least one encrypted key to the network function service consumer.

The request for the at least one key may comprise the public key or an indication of where to obtain the public key.

The indication of where to obtain the public key may comprise an indication of one of the following: from a transport layer security, TLS, certificate; or from a client credentials assertion, CCA.

The at least one encrypted key may comprise at least one of: an encrypted first key for decrypting the protected sensitive data; or an encrypted second key for integrity verification of the protected sensitive data.

The method may further comprise: registering a profile for the network function service producer at a network repository function, wherein the profile comprises an indication that the network function service producer is able to provide the at least one key to the network function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The method may further comprise performing integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The method may further comprise performing encryption on the integrity protected sensitive data by: using a symmetric encryption function with the encryption key on the integrity protected sensitive data to obtain the integrity protected and encrypted sensitive data.

The method may further comprise performing encryption on sensitive data by: using a symmetric encryption function with the encryption key on the sensitive data to obtain encrypted sensitive data.

According to an eleventh aspect, there is provided a method for an apparatus for a network repository function, the method comprising: storing profile information for a first network function service producer, wherein the profile comprises an indication that the first network function service producer is able to provide at least one first key associated with verifying and/or decrypting a first protected sensitive data to another network function; receiving, from a first network function service consumer, a request for a first access token for enabling the first network function service consumer to obtain the at least one first key; and providing the first network function service consumer with the requested access token.

The method may further comprise: receiving, from a second network function service producer, at least one second key associated with verifying and/or decrypting a second protected sensitive data; receiving, from a second network function service consumer, a request for a second access token for accessing the second protected sensitive data; wherein the request for the second access token comprises an indication that the second network function service consumer is configured to decrypt and/or verify protected sensitive data, and either a public key or an indication of where to obtain the public key; and wherein the public key is a public key of the second network function service consumer; encrypting the at least one second key using the public key to form at least one encrypted second key; and providing the at least one encrypted second key to the network function service consumer.

The at least one encrypted second key may be provided as part of an access token claim in response to the request for the access token.

The at least one encrypted second key may comprise at least one of: an encrypted key for decrypting the protected sensitive data; or an encrypted key for integrity verification of the protected sensitive data.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a twelfth aspect, there is provided a method for an apparatus for a first repository function, the method comprising: storing protected sensitive data received from a network function service producer; and providing the protected sensitive data to a network function service consumer.

The method may further comprise: receiving an indication from the network function service producer that the protected sensitive data is encrypted and/or integrity protected, and an indication of at least one entity that possesses at least one key associated with verifying and/or decrypting the protected sensitive data; and providing said indications to the network function service consumer.

The providing the protected sensitive data to a network function service consumer may comprise signalling an address from which the protected sensitive data may be downloaded.

The first repository function may be an analytics data repository function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The method may further comprise performing integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The method may further comprise performing encryption on the integrity protected sensitive data by: using a symmetric encryption function with the encryption key on the integrity protected sensitive data to obtain the integrity protected and encrypted sensitive data.

The method may further comprise performing encryption on sensitive data by: using a symmetric encryption function with the encryption key on the sensitive data to obtain encrypted sensitive data.

According to a thirteenth aspect, there is provided an apparatus for a network function service consumer, the apparatus comprising: retrieving circuitry for retrieving, from a first repository function, protected sensitive data; retrieving circuitry for retrieving, from a second network function, at least one encrypted key; decrypting circuitry for decrypting the retrieved at least one encrypted key using a private key associated with the network function service consumer to obtain a respective at least one key; and performing circuitry for performing at least one of: decryption of the protected sensitive data using the at least one key to obtain sensitive data or integrity protected sensitive data; or verification of the integrity of the protected sensitive data using the at least one key.

The apparatus may comprise performing circuitry for performing: obtaining, from a network repository function, an access token for authorising the apparatus to have access to the protected sensitive data; providing the access token to the first repository function as part of a service request for the protected sensitive data; and receiving the protected sensitive data in response to said providing.

The receiving circuitry for receiving the protected sensitive data may comprise: receiving circuitry for receiving an address from which the protected sensitive data may be downloaded; and downloading circuitry for downloading the protected sensitive data from the address.

The apparatus may comprise: receiving circuitry for receiving, from the first repository function, at least one of: an indication that the protected sensitive data is encrypted; an indication that the second network function comprises a key for decrypting the protected sensitive data; an indication that the protected sensitive data is integrity protected; or an indication that the second network function comprises a key and/or metadata associated with verifying the protected sensitive data.

The apparatus may comprise: signalling circuitry for signalling, to a network repository function, a request for the access token; wherein the request comprises an indication that the apparatus is configured to decrypt and/or verify protected sensitive data, and either a public key or an indication of where to obtain the public key; and wherein the public key is a public key of the network function service consumer to be used for encrypting the at least one key.

The indication of where to obtain the public key may comprise one of the following: from a transport layer security, TLS, certificate; or from a client credentials assertion, CCA.

The second network function may be a network repository function.

The second network function may be a network function service producer and/or a network analytics data function.

The at least one encrypted key may comprise at least one of: an encrypted first key for decrypting the protected sensitive data; or an encrypted second key for integrity verification of the protected sensitive data.

The protected sensitive data may comprise sensitive data and an expected message authentication code, XMAC, value and the at least one key may comprise an integrity protection key, and the verification of the integrity of the protected sensitive data using the at least one key comprises performing: computing a message authentication code, MAC, value on the sensitive data by inputting the integrity protection key and the sensitive data to a keyed hash function to output the MAC value; comparing the MAC value to the XMAC value; and determining that the sensitive data is successfully verified when the MAC and XMAC values are the same.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a fourteenth aspect, there is provided an apparatus for a network function service producer, the apparatus comprising: protecting circuitry for protecting sensitive data using at least one key to form protected sensitive data; registering the protected sensitive data at a first repository function; and providing circuitry for providing the at least one key to a network function.

The providing circuitry for providing the at least one key to a network function may comprise providing circuitry for providing the at least one key to a network repository function.

The providing circuitry for providing the at least one key to a network function may comprise: receiving circuitry for receiving a request for the at least one key from a network function service consumer; encrypting the at least one key using a public key associated with the network function service consumer to form at least one encrypted key; and providing circuitry for providing the at least one encrypted key to the network function service consumer.

The request for the at least one key may comprise the public key or an indication of where to obtain the public key.

The indication of where to obtain the public key may comprise an indication of one of the following: from a transport layer security, TLS, certificate; or from a client credentials assertion, CCA.

The at least one encrypted key may comprise at least one of: an encrypted first key for decrypting the protected sensitive data; or an encrypted second key for integrity verification of the protected sensitive data.

The apparatus may comprise performing circuitry for performing: registering a profile for the network function service producer at a network repository function, wherein the profile comprises an indication that the network function service producer is able to provide the at least one key to the network function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The apparatus may comprise performing circuitry for performing integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The apparatus may comprise performing circuitry for performing encryption on the integrity protected sensitive data by: using a symmetric encryption function with the encryption key on the integrity protected sensitive data to obtain the integrity protected and encrypted sensitive data.

The apparatus may comprise performing circuitry for performing encryption on sensitive data by: using a symmetric encryption function with the encryption key on the sensitive data to obtain encrypted sensitive data.

According to a fifteenth aspect, there is provided an apparatus for a network repository function, the apparatus comprising: storing circuitry for storing profile information for a first network function service producer, wherein the profile comprises an indication that the first network function service producer is able to provide at least one first key associated with verifying and/or decrypting a first protected sensitive data to another network function; receiving circuitry for receiving, from a first network function service consumer, a request for a first access token for enabling the first network function service consumer to obtain the at least one first key; and providing circuitry for providing the first network function service consumer with the requested access token.

The apparatus may comprise performing circuitry for performing: receiving, from a second network function service producer, at least one second key associated with verifying and/or decrypting a second protected sensitive data; receiving, from a second network function service consumer, a request for a second access token for accessing the second protected sensitive data; wherein the request for the second access token comprises an indication that the second network function service consumer is configured to decrypt and/or verify protected sensitive data, and either a public key or an indication of where to obtain the public key; and wherein the public key is a public key of the second network function service consumer; encrypting the at least one second key using the public key to form at least one encrypted second key; and providing the at least one encrypted second key to the network function service consumer.

The at least one encrypted second key may be provided as part of an access token claim in response to the request for the access token.

The at least one encrypted second key may comprise at least one of: an encrypted key for decrypting the protected sensitive data; or an encrypted key for integrity verification of the protected sensitive data.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a sixteenth aspect, there is provided an apparatus for a first repository function, the apparatus comprising: storing circuitry for storing protected sensitive data received from a network function service producer; and providing circuitry for providing the protected sensitive data to a network function service consumer.

The apparatus may comprise performing circuitry for performing: receiving an indication from the network function service producer that the protected sensitive data is encrypted and/or integrity protected, and an indication of at least one entity that possesses at least one key associated with verifying and/or decrypting the protected sensitive data; and providing said indications to the network function service consumer.

The providing circuitry for providing the protected sensitive data to a network function service consumer may comprise signalling circuitry for signalling an address from which the protected sensitive data may be downloaded.

The first repository function may be an analytics data repository function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The apparatus may comprise performing circuitry for performing integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The apparatus may comprise performing circuitry for performing encryption on the integrity protected sensitive data by: using a symmetric encryption function with the encryption key on the integrity protected sensitive data to obtain the integrity protected and encrypted sensitive data.

The apparatus may comprise performing circuitry for performing encryption on sensitive data by: using a symmetric encryption function with the encryption key on the sensitive data to obtain encrypted sensitive data.

According to a seventeenth aspect, here is provided non-transitory computer readable medium comprising program instructions for causing an apparatus for a network function service consumer to perform at least the following: retrieve, from a first repository function, protected sensitive data; retrieve, from a second network function, at least one encrypted key; decrypt the retrieved at least one encrypted key using a private key associated with the network function service consumer to obtain a respective at least one key; and perform at least one of: decryption of the protected sensitive data using the at least one key to obtain sensitive data or integrity protected sensitive data; or verification of the integrity of the protected sensitive data using the at least one key.

The apparatus may be further caused to perform: obtaining, from a network repository function, an access token for authorising the apparatus to have access to the protected sensitive data; providing the access token to the first repository function as part of a service request for the protected sensitive data; and receiving the protected sensitive data in response to said providing.

The receiving the protected sensitive data may comprise: receiving an address from which the protected sensitive data may be downloaded; and downloading the protected sensitive data from the address.

The apparatus may be further caused to perform: receiving, from the first repository function, at least one of: an indication that the protected sensitive data is encrypted; an indication that the second network function comprises a key for decrypting the protected sensitive data; an indication that the protected sensitive data is integrity protected; or an indication that the second network function comprises a key and/or metadata associated with verifying the protected sensitive data.

The apparatus may be further caused to perform: signalling, to a network repository function, a request for the access token; wherein the request comprises an indication that the apparatus is configured to decrypt and/or verify protected sensitive data, and either a public key or an indication of where to obtain the public key; and wherein the public key is a public key of the network function service consumer to be used for encrypting the at least one key.

The indication of where to obtain the public key may comprise one of the following: from a transport layer security, TLS, certificate; or from a client credentials assertion, CCA.

The second network function may be a network repository function.

The second network function may be a network function service producer and/or a network analytics data function.

The at least one encrypted key may comprise at least one of: an encrypted first key for decrypting the protected sensitive data; or an encrypted second key for integrity verification of the protected sensitive data.

The protected sensitive data may comprise sensitive data and an expected message authentication code, XMAC, value and the at least one key may comprise an integrity protection key, and the verification of the integrity of the protected sensitive data using the at least one key comprises performing: computing a message authentication code, MAC, value on the sensitive data by inputting the integrity protection key and the sensitive data to a keyed hash function to output the MAC value; comparing the MAC value to the XMAC value; and determining that the sensitive data is successfully verified when the MAC and XMAC values are the same.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to an eighteenth aspect, here is provided non-transitory computer readable medium comprising program instructions for causing an apparatus for a network function service producer to perform at least the following: protect sensitive data using at least one key to form protected sensitive data; register the protected sensitive data at a first repository function; and provide the at least one key to a network function.

The providing the at least one key to a network function may comprise providing the at least one key to a network repository function.

The providing the at least one key to a network function may comprise: receiving a request for the at least one key from a network function service consumer; encrypting the at least one key using a public key associated with the network function service consumer to form at least one encrypted key; and providing the at least one encrypted key to the network function service consumer.

The request for the at least one key may comprise the public key or an indication of where to obtain the public key.

The indication of where to obtain the public key may comprise an indication of one of the following: from a transport layer security, TLS, certificate; or from a client credentials assertion, CCA.

The at least one encrypted key may comprise at least one of: an encrypted first key for decrypting the protected sensitive data; or an encrypted second key for integrity verification of the protected sensitive data.

The apparatus may be further caused to perform: registering a profile for the network function service producer at a network repository function, wherein the profile comprises an indication that the network function service producer is able to provide the at least one key to the network function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The apparatus may be further caused to perform integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The apparatus may be further caused to perform encryption on the integrity protected sensitive data by: using a symmetric encryption function with the encryption key on the integrity protected sensitive data to obtain the integrity protected and encrypted sensitive data.

The apparatus may be further caused to perform encryption on sensitive data by: using a symmetric encryption function with the encryption key on the sensitive data to obtain encrypted sensitive data.

According to a nineteenth aspect here is provided non-transitory computer readable medium comprising program instructions for causing an apparatus for a network repository function to perform at least the following: store profile information for a first network function service producer, wherein the profile comprises an indication that the first network function service producer is able to provide at least one first key associated with verifying and/or decrypting a first protected sensitive data to another network function; receive, from a first network function service consumer, a request for a first access token for enabling the first network function service consumer to obtain the at least one first key; and provide the first network function service consumer with the requested access token.

The apparatus may be further caused to perform: receiving, from a second network function service producer, at least one second key associated with verifying and/or decrypting a second protected sensitive data; receiving, from a second network function service consumer, a request for a second access token for accessing the second protected sensitive data; wherein the request for the second access token comprises an indication that the second network function service consumer is configured to decrypt and/or verify protected sensitive data, and either a public key or an indication of where to obtain the public key; and wherein the public key is a public key of the second network function service consumer; encrypting the at least one second key using the public key to form at least one encrypted second key; and providing the at least one encrypted second key to the network function service consumer.

The at least one encrypted second key may be provided as part of an access token claim in response to the request for the access token.

The at least one encrypted second key may comprise at least one of: an encrypted key for decrypting the protected sensitive data; or an encrypted key for integrity verification of the protected sensitive data.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

According to a twentieth aspect, here is provided non-transitory computer readable medium comprising program instructions for causing an apparatus for a first repository function to perform at least the following: store protected sensitive data received from a network function service producer; and provide the protected sensitive data to a network function service consumer.

The apparatus may be further caused to perform: receiving an indication from the network function service producer that the protected sensitive data is encrypted and/or integrity protected, and an indication of at least one entity that possesses at least one key associated with verifying and/or decrypting the protected sensitive data; and providing said indications to the network function service consumer.

The providing the protected sensitive data to a network function service consumer may comprise signalling an address from which the protected sensitive data may be downloaded.

The first repository function may be an analytics data repository function.

The sensitive data may be a machine learning model.

The protected sensitive data may comprise sensitive data that has been protected by at least one of integrity protection or encryption, wherein the integrity protection has been performed using an integrity protection key, and wherein the encryption has been performed using an encryption key.

The integrity protection may have been performed using the integrity protection key with a keyed hash function.

The keyed hash function may be a keyed hash message authentication code, H MAC, function.

The protected sensitive data may comprise one of: integrity protected sensitive data, encrypted sensitive data, or integrity protected and encrypted sensitive data.

The apparatus may be further caused to perform integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together.

The apparatus may be further caused to perform: encryption on the integrity protected sensitive data by: using a symmetric encryption function with the encryption key on the integrity protected sensitive data to obtain the integrity protected and encrypted sensitive data.

The apparatus may be further caused to perform: encryption on sensitive data by: using a symmetric encryption function with the encryption key on the sensitive data to obtain encrypted sensitive data.

According to a twenty first aspect, there is provided a computer program product stored on a medium that may cause an apparatus to perform any method as described herein.

According to a twenty second aspect, there is provided an electronic device that may comprise apparatus as described herein.

According to a twenty third aspect, there is provided a chipset that may comprise an apparatus as described herein.

BRIEF DESCRIPTION OF FIGURES

Some examples, will now be described, merely by way of illustration only, with reference to the accompanying drawings in which.

DETAILED DESCRIPTION

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

Figure 1A:
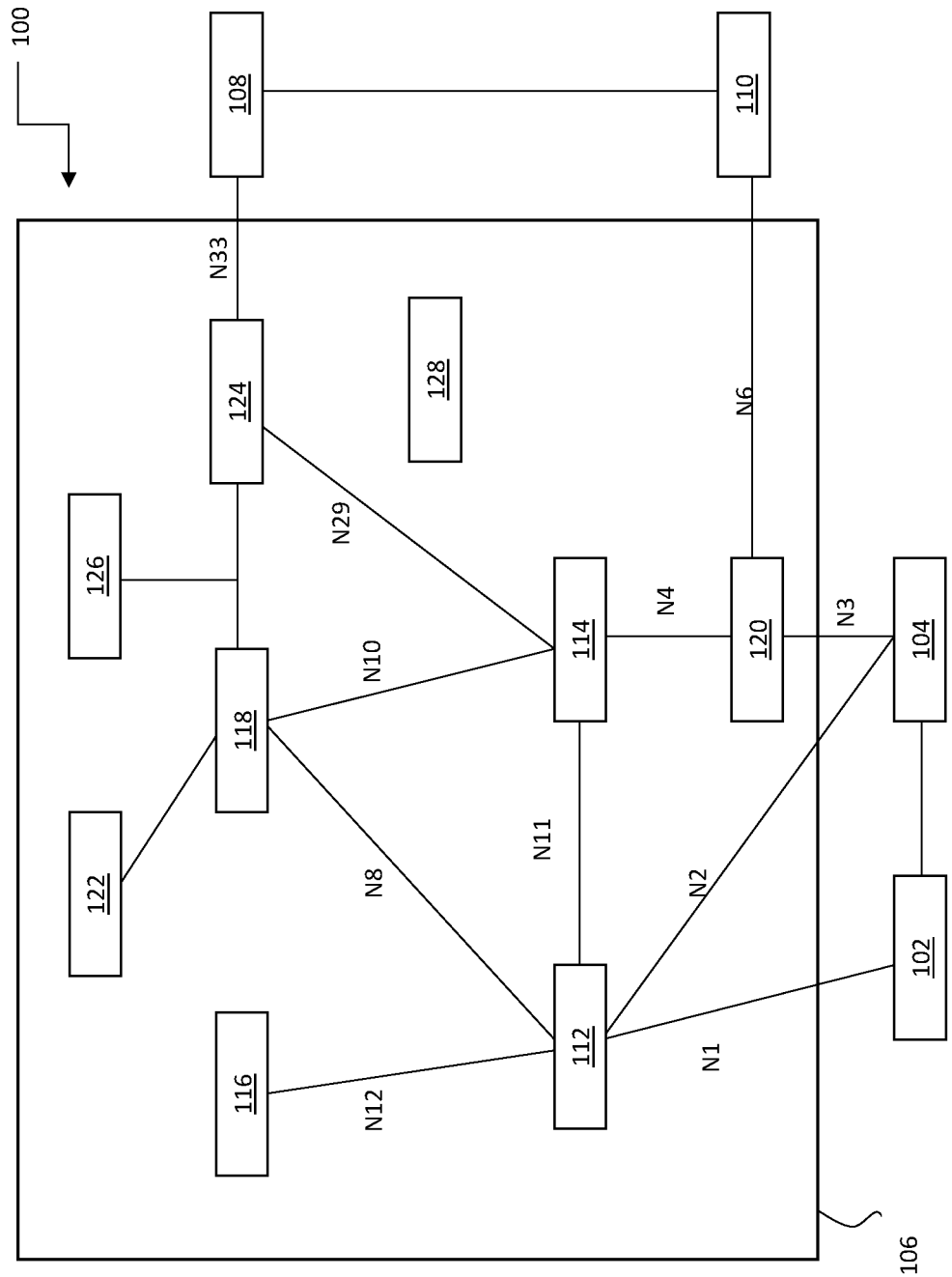
FIGS. 1A and 1B show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF), a Trusted Non3GPP Gateway Function (TNGF) for Untrusted/Trusted Non-3GPP access or a Wireline Access Gateway Function (W-AGF) for Wireline access 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
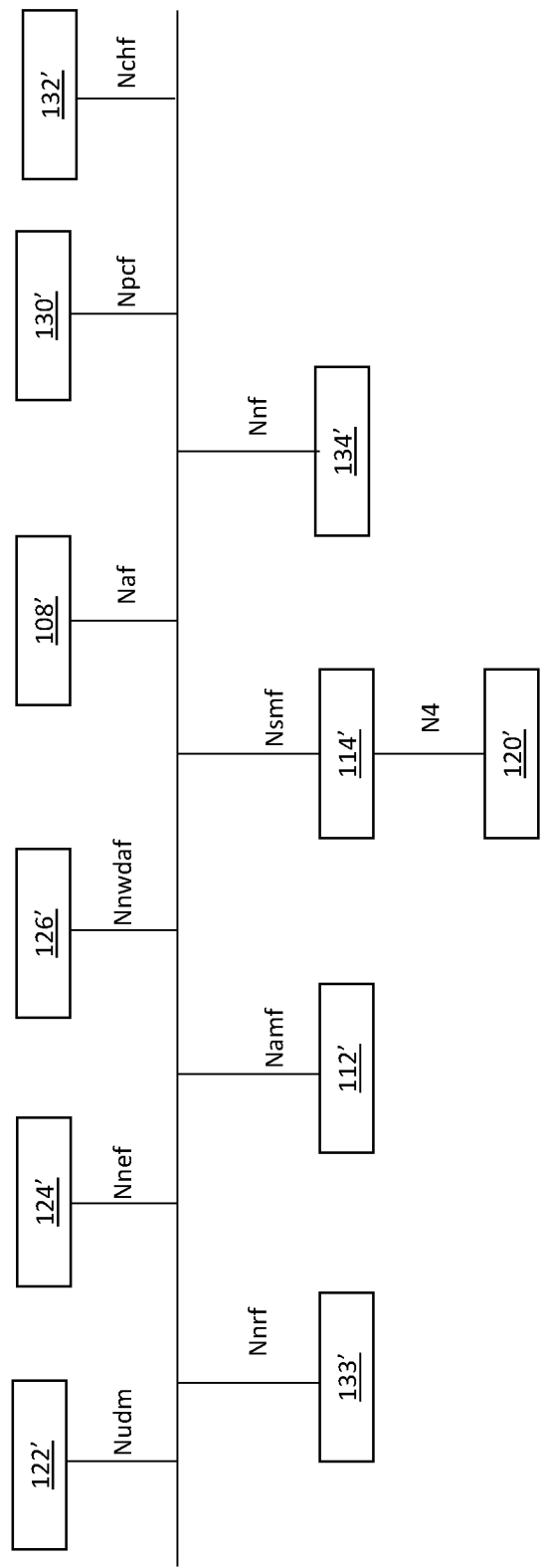

FIG. 1B shows a schematic representations of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging Function 132' over an interconnect medium that also connects these network functions to each other. The 5G core 106' further comprises a network repository function (NRF) 133' and a network function 134' that connect to the interconnect medium.

3GPP refers to a group of organizations that develop and release different standardized communication protocols. 3GPP develops and publishes documents pertaining to a system of "Releases" (e.g., Release 15, Release 16, and beyond).

3GPP TS 23.288 defined an entity called an Analytics Data Repository Function (ADRF). The ADRF acts as a central data repository to assist analytics for network functions (NFs) in the 5G Core.

In particular, an Analytics Data Repository Service is used for the Analytics Data Repository Function (ADRF) for storage and retrieval of data by e.g. Consumer NF(s) (e.g. NWDAF), which access the data using Nadrf service. In other words, there is provided a service for enabling NF service consumers to request the ADRF to store, and/or retrieve, and/or delete data and analytics.

Some Release 18 studies have considered the enhancement of the ADRF for enabling the ADRF to store (or otherwise facilitate access to) sensitive data. The sensitive data may be proprietary data. For example, the sensitive data may be Machine Learning (ML) models authorized by at least one network function service producer. The ML models may be used for a variety of purposes. For example, ML models may be used to assist in network analytics for determining operational parameters to be used within a network. The ADRF enhancement may help facilitate distribution and sharing of the stored sensitive data amongst NFs (potentially even enabling sharing of machine learning models belonging to different vendors).

Another key objective identified in current Release 18 studies has been to study the security enhancements needed based upon the ongoing work on the architecture of the 3GPP system. There have also been discussions and proposals for further study aiming at the application of Zero Trust Security principles for 5G Core.

The zero trust security model describes an approach to the design and implementation of IT systems. The main concept behind the zero trust security model is "never trust, always verify," which means that devices are not trusted by default, even if they are connected to a permissioned network such as a corporate local access network (LAN), and even if they were previously verified. Most modern corporate networks consist of many interconnected zones, cloud services and infrastructure, connections to remote and mobile environments, and connections to non-conventional IT, such as IoT devices. The reasoning for zero trust is that the traditional approach—trusting devices within a notional "corporate perimeter", or devices connected via a virtual private network (VPN)—is not relevant in the complex environment of a corporate network. The zero trust approach advocates mutual authentication, including checking the identity and/or integrity of devices without respect to location, and providing access to applications and services based on the confidence of device identity and device health in combination with user authentication Since sensitive data such as ML models and their algorithms may be proprietary (i.e., subject to intellectual property rights of the designer), it would be useful to ensure that only the NFs which have indeed been provided with access authorization to particular sensitive data can read and use that data.

Due to the nature of key indicators that the 3GPP architecture group is currently working on and the fact that more and more emphasis is being given to the Zero trust security principles, the ADRF cannot be considered as a trusted entity for storing the proprietary and/or sensitive data. In particular, in the case of a malicious ADRF and/or a negligent ADRF, there may be no protection against accessing and reading sensitive data from the ADRF. This means that sensitive data may be exposed at rest in ADRF. Also a malicious and/or negligent ADRF may be able to access the model and even send the 'unprotected' sensitive data to another entity.

Further, it may be difficult to transfer large sensitive data over a standard interface due to its size (for example, an ML model may be of the order of 200 MB, 500 MB etc.). Therefore, the ADRF should be able to provide a standard Application Programming Interface (API) that comprises an address (e.g., a uniform resource identifier (URI)) from where sensitive data can be downloaded via at least one transfer protocol. Examples of different transfer protocols include, for example, hypertext transfer protocol (HTTP), hypertext transfer protocol secure (HTTPS), file transfer protocol (FTP), secure file transfer protocol (SFTP), file transfer protocol with explicit SSL (FTPES) and secure copy protocol (SCP).

Even when the ADRF is genuine and entitled to access the sensitive data, the URI being used to access and retrieve the sensitive data may be leaked and used by a potential attacker to have access to and potentially use the stolen sensitive data. From a security viewpoint, the sensitive data existing protection in this case only relies on the selected security capabilities of the selected transfer protocol (e.g., authentication and/or encryption), which may be insufficient.

Aspects of the following aim to address at least one of the above-mentioned issues. In particular, the following aims to provide at least one mechanism for enabling potentially highly valuable sensitive data (such as ML models) to be stored in the ADRF using end to end confidentiality, and to only enable those NF service consumers authorized to retrieve a particular sensitive data to decrypt and/or to perform integrity protection on the retrieved sensitive data.

As an aside, it is noted that the NF service producer (NFp) simply encrypting the ML model will not help in real scenarios. For example, whereas a first network data analytics function (NWDAF-1) may, when acting as an NF service producer (NFp), encrypt an ML model and store it in ADRF, a second network data analytics function (NWDAF-2) may, when acting as an NF service consumer (NFc) later on request to retrieve the model from the ADRF to consume the ML model for other purposes. Therefore, an end-to-end confidentiality and key sharing solution would be useful.

In light of this, the following proposes to define, by an NF service producer, a key/token that is used to protect sensitive data before the sensitive data is stored at the ADRF. The phrase "stored by the ADRF" (and variations thereof) is used herein to indicate that the ADRF manages access to the sensitive data, and should be not be construed as being limiting to the case that the sensitive data is stored locally at the ADRF. As discussed above, the ADRF may "store" sensitive data by storing respective addresses for accessing distinct sensitive data.

For clarity and brevity, the following refers to ML models as a specific example of sensitive data. However, it is understood that analogous procedures may be performed in respect of any sensitive information stored in an ADNF. Consequently, although the following refers to ML models for brevity, it is understood that these disclosures encompass examples in which an ML model is replaced by sensitive (e.g., confidential) data. In the present context, sensitive data is data understood by at least one entity to be restricted for access by at least one other entity. For example, sensitive data may be considered to be data that an NF service producer is configured to limit access to. It is further understood that references to an NF service consumer causing an ML model to be run further encompasses any use, by the NF service consumer, of the sensitive information.

It is further understood that although the following examples discuss models being protected in the context of encryption keys, this is for brevity, and that another key may be provided for protecting the models. This another key may be provided in addition to the encryption key and/or in an alternative to the encryption key.

For example, an integrity protection key Kint (also known as an integrity verification key) may be used with a keyed hash function, such as a keyed hash message authentication code (HMAC), to compute a hash value on sensitive data. For example, a keyed hash function accepts a message and a key as two inputs and outputs a hash digest. The keyed hash value may be used as a message authentication code (MAC) for integrity protection of the sensitive data (and, when the key is a shared secret key, authentication of the sensitive data. For example, a keyed hash function may be used with an integrity protection key Kint to compute a MAC value for an ML model stored as an expected MAC value (XMAC) together with the ML model at (or otherwise accessible via) the ADRF, and the integrity protection key may be provided to an NF service consumer (NFc) using at least one of the key transfer mechanisms illustrated below with respect to FIGS. 6 and 7. The integrity protection key may be used by the NFc to compute a message authentication code (MAC) on the ML model. The HMAC does not encrypt the message itself. Instead, the message (whether encrypted or not) may be provided to the NFc with an expected value of the MAC (XMAC). The NFc may subsequently verify the integrity of the ML model by checking that the computed value of the MAC equals the expected value of the MAC (XMAC) received together with the ML model from the ADRF.

It is therefore understood that discussions below in relation to "encrypted sensitive data" and/or "encryption key" may be analogously applied to "integrity protected data" and/or "integrity protection key" respectively. Consequently, the below discussion in respect of "encrypted sensitive data" and the like may be considered to more generally apply to "protected sensitive data", and the below discussion in respect of "encryption key" may be considered to more generally apply to "at least one key". "Protected sensitive data" is used in this context to indicate that at least one mechanism has been applied to the sensitive data for forming the protected sensitive data. The at least one mechanism may comprise an authentication function (such as, for example, an encryption technique) that allows only authenticated/authorized users access to the sensitive data. The at least one mechanism may comprise a tamper proofing function (such as, for example, an integrity protection technique) that enables a receiving entity of the protected sensitive data to verify that the sensitive data has not been altered between receipt by the receiving entity and the protection of the sensitive data by the at least one mechanism.

There is further provided a procedure to provide said key/token to any NF service consumers (NFc). This may be provided via, for example, a network repository function (NRF) and/or directly using a new service or function.

There is further provided a procedure for allowing an NFc to download protected sensitive data from the ADRF and to use the received key/token to decrypt/access the sensitive data.

This will be illustrated with reference to at least two different example implementations. In the two different implementations, the encryption key (and/or access token) is stored at a different location. For brevity in the following, the following will only refer to a key. However, it is understood that analogous procedures may be performed when the key is replaced by a token.

In a first example, which is illustrated below with respect to FIG. 6, there is provided an encryption Key K that is stored in the NRF. This encryption key may be stored at the NRF during the NF service producer registration for the ML Model.

Figure 6:
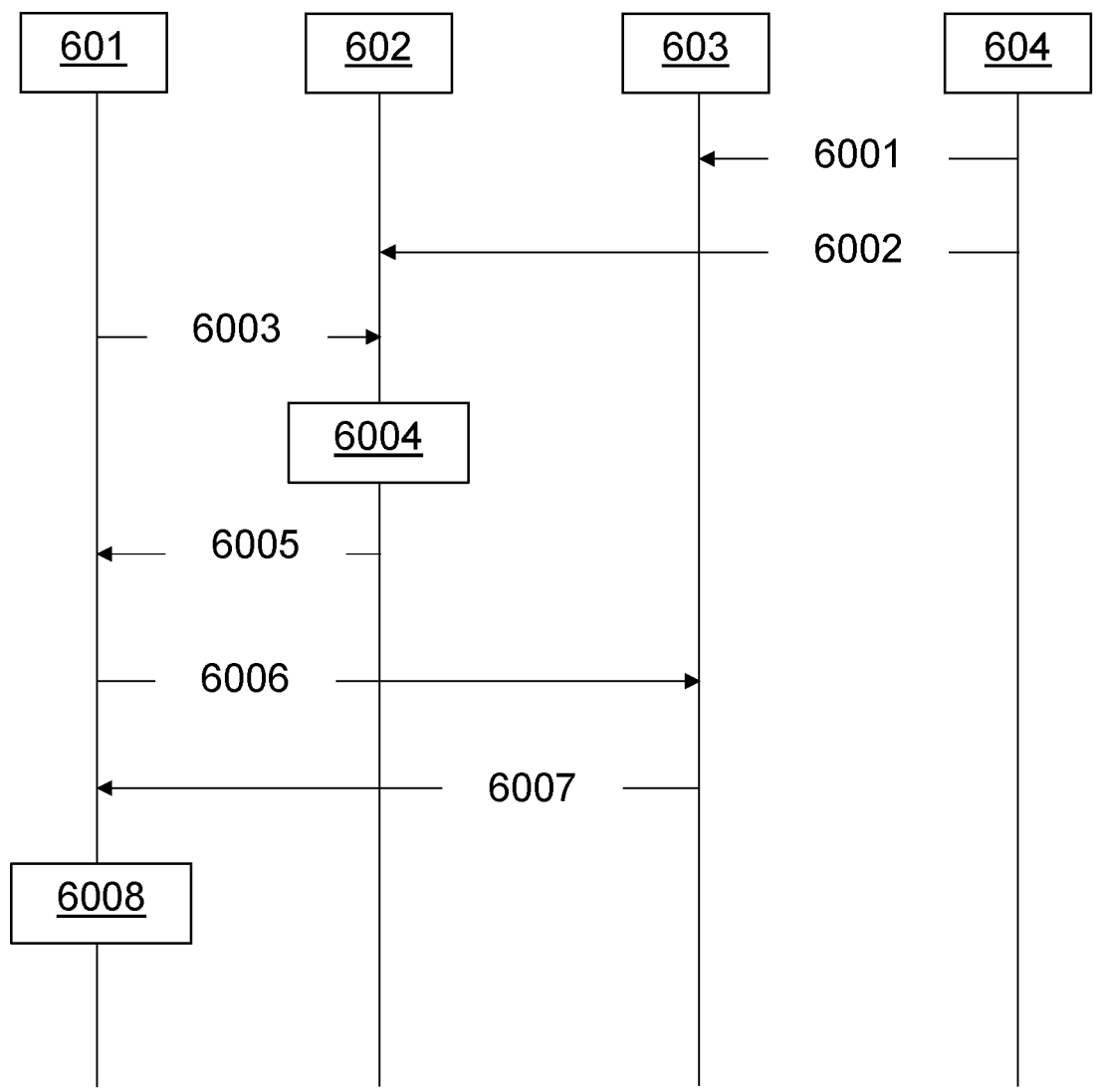
FIGS. 6 and 7 illustrate example signalling between different network elements.

FIG. 6 illustrates operations that may be performed by an NF service consumer 601 (e.g., an NWDAF Analytics logical function (AnLF)), an NRF 602, an ADRF 603, and an NF service producer 604 (e.g., an NWDAF Model Training logical function (MtLF)).

During 6001, the NFp 604 signals the ADRF 603. This signalling of 6001 may cause the ADRF to store a first ML model in an encrypted format, wherein the ML model encryption has been performed by NFp 605. The first ML model may be encrypted using a first key, K. This key K may be a secret that is model specific. In other words, for each model identifier, a new key will be used. In other words, the key used to encrypt the model may be unique to that model.

Any known method may be used to generate the key. Further, the model may be encrypted in whole or in part. How much and/or which parts of the model are to be encrypted may be defined by operator policy. For example, metadata and/or binary data may be encrypted. In general, the model should be, at a minimum, encrypted such that an interceptor of the encrypted model is unable to cause the intercepted model to run without further information and/or authorisation on the model.

During 6002, the NFp 604 signals the NRF 602. This signalling may cause the NRF 602 to be provided with the key, K, that was used to encrypt the ML model. This signalling may comprise a request to register the NFp 604 and/or the NFp's model at the NRF 602. The NRF 602 may register profile information for the NFp 604. The NRF 602 may register, in the NFp's 604 profile information, ML model information in addition to the encryption key K with which the ML model was encrypted. It is understood that the signalling of 6002 does not need to be a registration message. In particular, a new service can be provided by NRF for this purpose, and/or an existing update service may be used to update the stored profile information for the NFp 604.

At 6003, the NFc 601 signals the NRF 602. This signalling may comprise a request for an access token for accessing the ML model from the ADRF 603. The NFc 601 may comprise this request as part of a discovery request for discovering the ML model. The NFc 601 may comprise this request as part of new and/or existing signalling between an NFc 601 and an NRF 602. Where the signalling of 6003 is not a discovery request, the NFc 601 may identify the ML model to be the subject of the request for the access token by comprising an identifier for the ML model in the request of 6003. The identifier for the ML model may be obtained by the NFc 601 via previously performed signalling. For example, the NFc 601 may have obtained the identifier for the ML model by signalling an earlier discovery request to the NRF 602 and receiving an identifier for the ML model (not shown). It is understood that this is not limiting, and that alternative signalling may be performed to receive an identifier for the ML model, including signaling a discovery request to a different NRF.

The signalling of 6003 may further comprise an indication that the NFc 601 supports encrypted model retrieval and/or retrieval of the NFc's public key. This may be indicated via an NF profile for the NFc stored at the NRF 602, via the NFc 601 including a client credentials assertion (CCA) in the signalling of 6003 and/or via a trusted third party, such as a certificate authority (CA). This is discussed below with respect to Table 1.

Table 1 comprises an indication of at least some of the information elements that may be comprised in the request for the access token. This request is enhanced relative to known access token requests in that it may indicate how the Key, K, is to be encrypted for provision to the NFc 601 (i.e., namely via the NFc's public key in the NRF 602, obtained from a client credentials assertion (CCA) and/or fetched from a trusted third party, such as a certificate authority (CA) of a public key infrastructure (PKI). This additional information element is labelled in Table 1 as "EncryptResponse", although it is understood that any suitable labelling may be used.

TABLE 1

Access Token Request Information elements

| Attribute name | Data type | Cardinality | Description |
| --- | --- | --- | --- |
| grant_type | GrantType | 1 | This information element comprises the grant type as "client_credentials" |
| nfInstanceId | NfInstanceId | 1 | This information element comprises the NF instance identifier of the NF service consumer. |
| EncryptResponse | 1: Via NFc Key in NRF<br>2: Via public key in CCA<br>. . . | 1 | This information element comprises information on whether NFc supports encrypted ML models, and where to fetch the public key of NFc from. |

As shown in Table 1, when the NFc 601 supports both ways of being provided with an encrypted key, then the NFc may indicate which method the NFc prefers to be used by the NRF to obtain a public key for the NFc, and only using that key the NRF should encrypt the Key K used previously to encrypt the ML model.

During 6004, the NRF 602 verifies that the NFc 601 is authorized to retrieve the ML model stored at 6001 and, in response to a successful verification, forms an access token request response that comprises the key, K, of 6002 that has been encrypted by the public key of the NFc indicated at 6003. This encrypted key (i.e., the key, K, encrypted by the NFc's public key) will be labelled herein as K'. When the NRF 602 does not successfully verify the NFc 601, the NRF 602 does not perform the subsequent steps. However, it is understood that the NRF 602 may signal an indication to the NFc that the verification was unsuccessful.

During 6005, the NRF 602 signals the NFc 601. This signalling of 6005 comprises the encrypted key, K'. The encrypted key, K', may be comprised in the access token (e.g., as part of an access token claim), and/or the encrypted key may be comprised in a separate parameter and/or information element in the signalling of 6002. In one example, a service communication proxy (SCP) may pass the encrypted key K' to the NFc 601 in a service response.

As the encrypted key K' is encrypted using the NFc's public key, the encrypted key K' may be only decrypted by the NFc's private key. This means that if the encrypted key K' is leaked/intercepted during transmission (which may, for example, be due to the presence of a malicious man-in-the-middle (MitM) element such as a rogue service communication proxy), the Key K' cannot be used since it is transferred in encrypted form.

Table 2 illustrates an information element (labelled as "DataEncryptionKey" herein) comprised in the access token claims that comprises the encrypted key, K'. As mentioned above, the encrypted key need not be provided as part of the access token claims, and may instead be provided separately. In other words, it is understood that this information element may instead be provided to the NFc separately from the access token claims.

service may be a new service provided by the NFp 704. This record may specify whether the NFp 704 is generally contactable, and/or only contactable in respect of specific ML models. This function of the signalling of 7002 may be effected via a flag in the signalling.

TABLE 2

Access Token claims Information Elements

| Attribute name | Data type | Cardinality | Description |
| --- | --- | --- | --- |
| Iss | NfInstanceId | 1 | This information element (IE) may comprise an NF instance id of the NRF, corresponding to the standard "Issuer" claim described in IETF RFC 7519 |
| DataEncryptionKey | String | 0 . . . 1 | This information element may comprise the Key K encrypted using the public key of the NFc |
| DataIntegrityProtectionKey | String | 0 . . . 1 | This information element may comprise the key Kint encrypted using the public key of the NFc |

During 6006, the NFc 601 signals the ADRF 603. This signalling of 6006 may be a request for service in respect of the ML model. The signalling of 6006 may comprise the received access token.

During 6007, the ADRF 603 responds to the signalling of 6007 when the ADRF 603 successfully verifies the received access token of 6006. The signalling of 6007 may comprise an indication of an address (e.g., a URI) at which the encrypted ML model may be accessed and/or downloaded. Although not shown, when the access token is not successfully verified, the ADRF 603 may return an error message to the NFc 603 indicating that the access token was not successfully verified.

During 6008, the NFc 601 decrypts the key, K, from the encrypted key, K', using the NFc's private key. The NFc 601 subsequently downloads the encrypted ML model, and decrypts the ML model using the key, K. The NFc 601 may then cause the ML model to be run.

Figure 7:
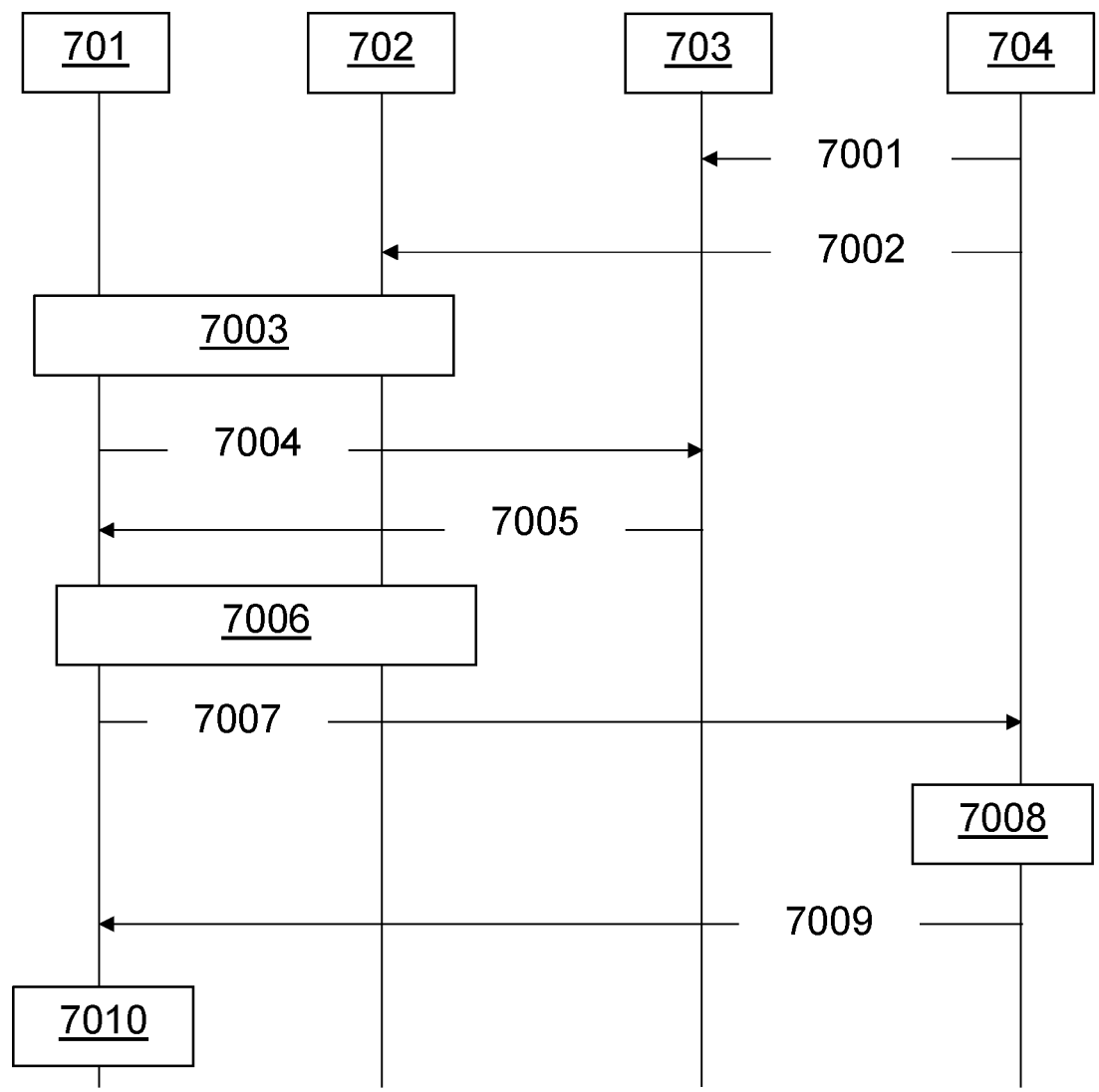

FIG. 7 illustrates another example mechanism. In this example of FIG. 7, the encryption Key K is stored only in the NF Service Producer (NFp), and the NF Service Consumer retrieves the key directly from the NFp instead of from the NRF.

FIG. 7 illustrates signalling that may be performed between an NF service consumer 701, and NRF 702, an ADRF 703, and an NF service producer 704. These entities may be as described above in relation to FIG. 6.

At 7001, the NFp 704 signals the ADRF 703. This signalling of 7001 may comprise an encrypted form of an ML model. The ML model may be encrypted as described above in relation to 6001.

The signalling of 7001 may further comprise metadata that indicates that the ML model is encrypted and there is at least one possessor of the encryption key, K. In the present example, the NFp 704 is the possessor of the encryption key, K, and so the metadata may comprise an identifier of the NFp 704. The signalling of 7001 does not comprise the encryption key, K.

During 7002, the NFp 704 signals the NRF 702. This signalling of 7002 may comprise a request to record, in the NF profile for the NFp 704 maintained by the NRF 702, that the NFp 704 is available for key retrieval. This key retrieval During 7003, the NFc 701 and the NRF 702 interact such that the NFc 702 discovers the ML model and retrieves an access token for the NFc to download the ML model from the ADRF 703.

During 7004, the NFc 701 signals the ADRF 703. This signalling of 7004 may comprise a service request for the ML model. This signaling of 7004 may comprise the access token received during 7003.

In response to the signalling of 7004, the ADRF 703 may verify whether or not the NFc 701 is allowed to access the requested ML model. This verification may be performed using the access token. When the NFc is not successfully verified by the ADRF 703 for the ML model, the ADRF 703 may signal an error response to the NFc 701 that indicates that the NFc was not successfully verified for the ML model (not shown).

When the ADRF 703 successfully verifies the NFc 703, the ADRF 703 signals the NFc 701 at 7005. This signalling of 7005 comprises a service response. The service response may comprise an address from which the requested ML model may be downloaded. For example, the service response may comprise a URI identifying where the ML model may be downloaded from. The service response may comprise an indication that the ML model is encrypted. This indication of the encryption may be signalled in metadata as described above in relation to 7001. The service response may comprise an indication and/or identifier of the at least one possessor of the encryption key, K. For example, the service response may comprise the above-mentioned metadata. For example, the service response may comprise an identifier of the NFp 704 in the present example.

During 7006, the NFc 701 and the NRF 702 may exchange signalling for the NFc 701 to discover (and obtain an access token for) enabling the NFc to access a new service at the NFp 704.

During 7007, the NFc 701 signals the NFp 704. This signalling of 7007 may comprise a service request. The service request may comprise a public key that may be usable for the NFp 704 to encrypt any information sent back to the NFc 701. Alternatively to comprising the public key, the service request may comprise an indication of where the public key may be found. For example, the NFc 701 may indicate, in the service request, to the NFp 704 that the NFp 704 may retrieve a public key for this purpose. For example, a public key for this purpose may be obtained/retrieved from a Transport Layer Security (TLS) certificate between the NFp 704 and the NFc 701, from a client credentials assertion (CCA), and/or from a trusted third party such as a certificate authority (CA) that holds the public key.

In response to the signalling of 7007, the NFp 704 may verify whether or not the NFc 701 is allowed to access the requested service at 7008. This verification may be performed using the access token received during 7007. When the NFc 701 is not successfully verified by the NFp 704 for the service, the NFp 704 may signal an error response to the NFc 701 that indicates that the NFc 701 was not successfully verified for the service (not shown).

When the NFp 704 successfully verifies the NFc 701 during 7008, the NFp 704 signals the NFc 701 at 7009. The signalling of 7009 may comprise a service response. This service response may comprise an encrypted version (K') of the key (K). The encrypted key K' may be the key K encrypted using the public key discussed above in relation to 7007.

During 7010, the NFc 701, ADRF 703, and NRF 702 act such that the NFc decrypts the encrypted key K' using the NFc's 701 private key to obtain the key K, the NFc 701 downloads the ML model, and then the NFc 701 decrypts the ML model using the obtained key, K. The NFc 701 may subsequently cause the ML model to be run.

As discussed above, the above-described examples of FIGS. 6 and 7 may be applied for transferring a hash-based key instead of transferring an encryption-based key. For example, a message authentication code (MAC) computed by a keyed hash function (for instance keyed hash message authentication code (HMAC)) may be stored as a metadata alongside the ML model, such that when the ML model is requested by the NFc, the keyed hash is provided to the NFc. The NFc may verify the integrity of the ML model, by verifying the MAC.

It is further understood that although the above examples illustrate a single protection mechanism being applied to sensitive data at any one time, the above-examples may alternatively utilize multiple protection mechanisms simultaneously on the sensitive data. For example, the sensitive data may be first integrity protected using an integrity protection key, and subsequently encrypted using an encryption key to form encrypted integrity-protected sensitive data (or vice-versa). The integrity protection key and the encryption key may be encrypted for provision to the NFc using at least one public key of the NFc (i.e., the integrity protection key may be encrypted using a different public key of the NFc to a public key of the NFc used for encryption of the encryption key, or a same public key of the NFc may be used to encrypt both keys).

FIGS. 8 to 11 illustrates operations that may be performed by various apparatus described herein. It is understood that these operations highlight at least some of the operations illustrated in the above examples and that, as such, features of the above-mentioned examples, may also be implemented by the following described apparatus (depending on the implementation).

Figure 8:
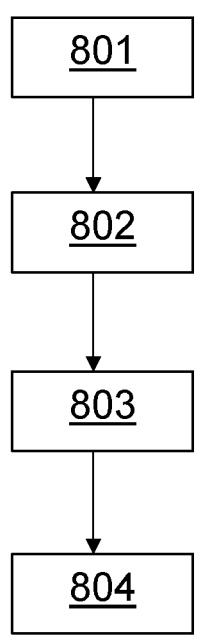
FIGS. 8 to 11 illustrate operations that may be performed by example apparatus.

FIG. 8 illustrates operations that may be performed by an apparatus for a network function service consumer.

At 801, the apparatus retrieves, from a first repository function, protected sensitive data.

At 802, the apparatus retrieves, from a second network function, at least one encrypted key.

At 803, the apparatus decrypts the retrieved at least one encrypted key using a private key associated with the network function service consumer to obtain a respective at least one key.

At 804, the apparatus performs at least one of: decryption of the protected sensitive data using the at least one key to obtain sensitive data or integrity protected sensitive data; and/or verification of the integrity of the protected sensitive data using the at least one key.

The apparatus may further perform: obtaining, from a network repository function, an access token for authorising the apparatus to have access to the protected sensitive data; providing the access token to the first repository function as part of a service request for the protected sensitive data; and receiving the protected sensitive data in response to said providing. The receiving the protected sensitive data may comprise: receiving an address from which the protected sensitive data may be downloaded; and downloading the protected sensitive data from the address.

The apparatus may further perform: receiving, from the first repository function, at least one of: an indication that the protected sensitive data is encrypted; an indication that the second network function comprises a key for decrypting the protected sensitive data; an indication that the protected sensitive data is integrity protected; and/or an indication that the second network function comprises a key and/or metadata associated with verifying the protected sensitive data.

The apparatus may further perform signalling, to a network repository function, a request for the access token; wherein the request comprises an indication that the apparatus is configured to decrypt and/or verify protected sensitive data, and either a public key or an indication of where to obtain the public key; and wherein the public key is a public key of the network function service consumer to be used for encrypting the at least one key. The indication of where to obtain the public key may comprise one of the following: from a transport layer security, TLS, certificate; or from a client credentials assertion, CCA.

The second network function may be a network repository function.

The second network function may be a network function service producer and/or a network analytics data function.

The at least one encrypted key may comprise at least one of: an encrypted first key for decrypting the protected sensitive data; and/or an encrypted second key for integrity verification of the protected sensitive data.

The protected sensitive data may comprise sensitive data and an expected message authentication code, XMAC, value and the at least one key comprises an integrity protection key, and the verification of the integrity of the protected sensitive data using the at least one key may comprise performing: computing a message authentication code, MAC, value on the sensitive data by inputting the integrity protection key and the sensitive data to a keyed hash function to output the MAC value; comparing the MAC value to the XMAC value; and determining that the sensitive data is successfully verified when the MAC and XMAC values are the same.

Figure 9:
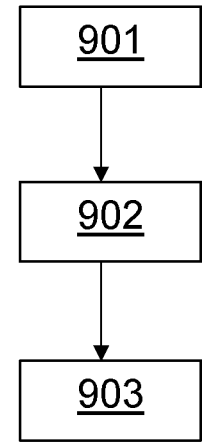

FIG. 9 illustrates operations that may be performed by an apparatus for a network function service producer (e.g., an NWDAF). The apparatus of FIG. 9 may be configured to interact with the apparatus of FIG. 8, as indicated above.

At 901, the apparatus protects sensitive data using at least one key to form protected sensitive data.

At 902, the apparatus registers the protected sensitive data at a first repository function.

At 903, the apparatus provides the at least one key to a network function.

The providing the at least one key to a network function may comprise providing the at least one key to a network repository function (i.e., the network repository function is the network function).

The providing the at least one key to a network function may comprise: receiving a request for the at least one key from a network function service consumer; encrypting the at least one key using a public key associated with the network function service consumer to form at least one encrypted key; and providing the at least one encrypted key to the network function service consumer (i.e., the network function service consumer is the network function).

The request for the at least one key may comprise the public key or an indication of where to obtain the public key.

The indication of where to obtain the public key may comprise an indication of one of the following: from a transport layer security, TLS, certificate; or from a client credentials assertion, CCA.

The at least one encrypted key may comprise at least one of: an encrypted first key for decrypting the protected sensitive data; and/or an encrypted second key for integrity verification of the protected sensitive data.

The apparatus may further perform: registering a profile for the network function service producer at a network repository function, wherein the profile comprises an indication that the network function service producer is able to provide the at least one key to the network function.

Figure 10:
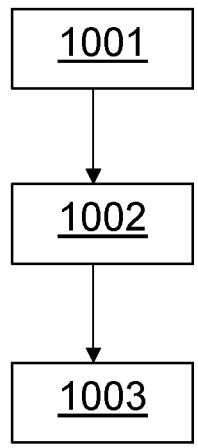

FIG. 10 illustrates operations that may be performed by an apparatus for a network repository function. The network repository function may be configured to interact with at least one of the apparatus of FIGS. 9 and 10.

At 1001, the apparatus stores profile information for a first network function service producer, wherein the profile comprises an indication that the first network function service producer is able to provide at least one first key associated with verifying and/or decrypting a first protected sensitive data to another network function.

At 1002, the apparatus receives, from a first network function service consumer, a request for a first access token for enabling the first network function service consumer to obtain the at least one first key.

At 1003, the apparatus provides the first network function service consumer with the requested access token.

The apparatus may further perform: receiving, from a second network function service producer, at least one second key associated with verifying and/or decrypting a second protected sensitive data; receiving, from a second network function service consumer, a request for a second access token for accessing the second protected sensitive data; wherein the request for the second access token comprises an indication that the second network function service consumer is configured to decrypt and/or verify protected sensitive data, and either a public key or an indication of where to obtain the public key; and wherein the public key is a public key of the second network function service consumer; encrypting the at least one second key using the public key to form at least one encrypted second key; and providing the at least one encrypted second key to the network function service consumer. The at least one encrypted second key may be provided as part of an access token claim in response to the request for the access token.

The at least one encrypted second key may comprise at least one of: an encrypted key for decrypting the protected sensitive data; or an encrypted key for integrity verification of the protected sensitive data.

Figure 11:
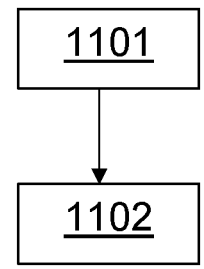

FIG. 11 illustrates operations that may be performed by an apparatus for a first repository function. The first repository function may interact with at least one of the apparatus of FIGS. 8 to 10. For example, the first repository function may be the first repository function referenced in relation to those Figures.

At 1101, the apparatus stores protected sensitive data received from a network function service producer.

At 1102, the apparatus provides the protected sensitive data to a network function service consumer.

The apparatus may further perform receiving an indication from the network function service producer that the protected sensitive data is encrypted and/or integrity protected, and an indication of at least one entity that possesses at least one key associated with verifying and/or decrypting the protected sensitive data; and providing said indications to the network function service consumer.

The apparatus may further perform providing the protected sensitive data to a network function service consumer comprises signalling an address from which the protected sensitive data may be downloaded.

The first repository function may be an analytics data repository function.

In all of the above examples of FIGS. 8 to 11, the sensitive data may be a machine learning model.

Further, for all of the above examples of FIGS. 8 to 11, the protected sensitive data comprises sensitive data that has been protected by at least one of integrity protection or encryption, wherein the integrity protection has been performed using an integrity protection key, and wherein the encryption has been performed using an encryption key. The integrity protection may have been performed using the integrity protection key with a keyed hash function. The keyed hash function may be a keyed hash message authentication code, HMAC, function. The protected sensitive data may comprise one of: integrity protected sensitive data, encrypted sensitive data, or integrity protected and encrypted sensitive data.

To help effect this at least one of the apparatus of FIG. 9 and the apparatus of FIG. 11 may be arranged to perform integrity protection on sensitive data by: inputting the integrity protection key and the sensitive data to a keyed hash function to compute an expected message authentication code, XMAC, on the sensitive data; and forming the integrity protected sensitive data by comprising the XMAC value and the sensitive data together. These apparatus may further perform encryption on the integrity protected sensitive data by: using a symmetric encryption function with the encryption key on the integrity protected sensitive data to obtain the integrity protected and encrypted sensitive data.

Further to help effect this at least one of the apparatus of FIG. 9 and the apparatus of FIG. 11 may be arranged to perform encryption on sensitive data by: using a symmetric encryption function with the encryption key on the sensitive data to obtain encrypted sensitive data.

The above described apparatus of each of FIGS. 8 to 11 may comprise at least one processor; and at least one memory including computer program code, the at least one memory and computer program code configured to, with the at least one processor, cause the performance of the apparatus.

Figure 2:
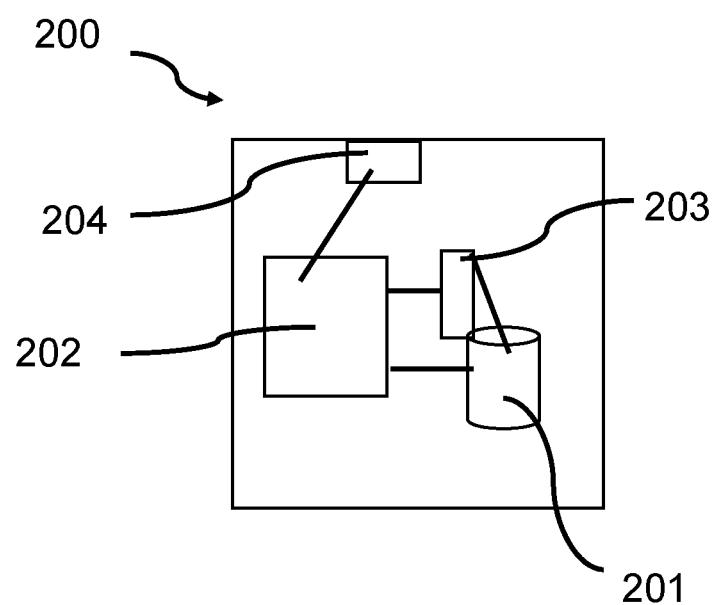
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth.

The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
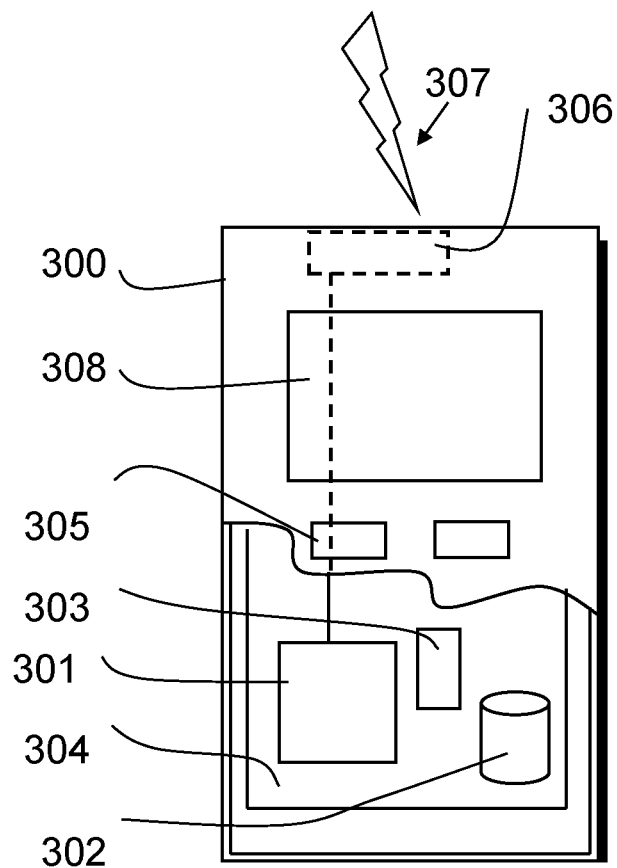
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
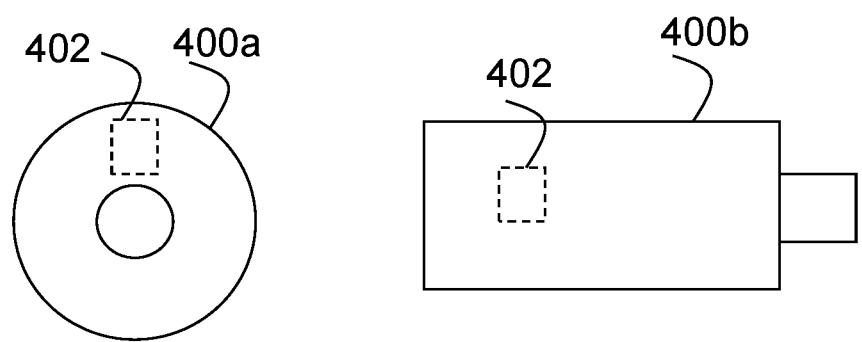
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 8 and/or FIG. 9 and/or FIG. 10 and/or FIG. 11, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 8 and/or FIG. 9 and/or FIG. 10, and/or FIG. 11, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:
 (a) hardware-only circuit implementations (such as implementations in only analogue and/or digital circuitry);
 (b) combinations of hardware circuits and software, such as:
   (i) a combination of analogue and/or digital hardware circuit(s) with software/firmware and
   (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
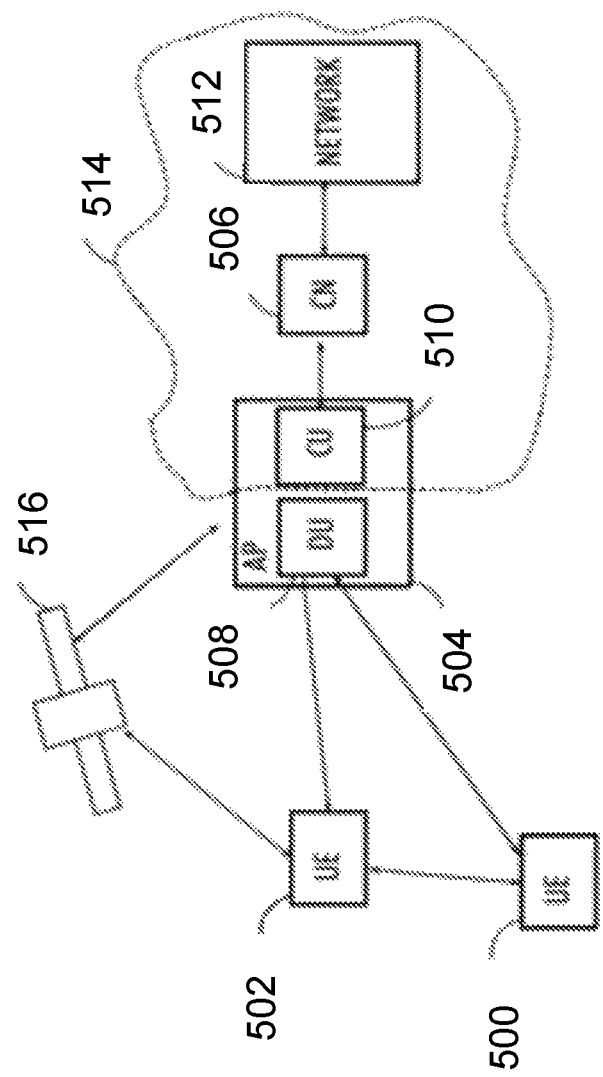
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

The expression "at least one of A or B" in this document means A, or B, or both A and B.

The invention claimed is:

1. An apparatus for a network function service consumer, the apparatus comprising:
   at least one processor; and
   at least one memory storing instructions that, when executed by the at least one processor, cause the apparatus at least to:
   retrieve, from a first repository function, protected sensitive data, wherein the sensitive data comprises a machine learning model;
   retrieve, from a second network function, at least one encrypted key, wherein the at least one encrypted key comprises an encrypted first key for integrity verification of the protected sensitive data;
   decrypt the retrieved at least one encrypted key using a private key associated with the network function service consumer to obtain a respective at least one key; and
   at least one of:
   decrypt the protected sensitive data using the at least one key to obtain sensitive data or integrity protected sensitive data; or
   verify the integrity of the protected sensitive data using the at least one key.

2. The apparatus of claim 1, wherein the at least one memory and the instructions are configured to, with the at least one processor, further cause the apparatus to:
   obtain, from a network repository function, an access token for authorising the apparatus to have access to the protected sensitive data;
   provide the access token to the first repository function as part of a service request for the protected sensitive data; and
   receive the protected sensitive data in response to said providing.

3. The apparatus of claim 2, wherein the receiving the protected sensitive data comprises:
   receive an address from which the protected sensitive data may be downloaded; and
   download the protected sensitive data from the address.

4. The apparatus of claim 2, wherein the at least one memory and the instructions are configured to, with the at least one processor, further cause the apparatus to:
   receive, from the first repository function, at least one of:
   an indication that the protected sensitive data is encrypted;
   an indication that the second network function comprises a key for decrypting the protected sensitive data;
   an indication that the protected sensitive data is integrity protected; or
   an indication that the second network function comprises a key and/or metadata associated with verifying the protected sensitive data.

5. The apparatus of claim 2, wherein the at least one memory and the instructions are configured to, with the at least one processor, further cause the apparatus to:
   signal, to a network repository function, a request for the access token; wherein
   the request comprises an indication that the apparatus is configured to decrypt and/or verify protected sensitive data, and either a public key or an indication of where to obtain the public key; and wherein
   the public key is a public key of the network function service consumer to be used for encrypting the at least one key.

6. The apparatus of claim 5, wherein the indication of where to obtain the public key comprises one of the following:
   from a transport layer security, TLS, certificate; or
   from a client credentials assertion, CCA.

7. The apparatus of claim 1, wherein the second network function is a network repository function.

8. The apparatus of claim 1, wherein the second network function is a network function service producer and/or a network analytics data function.

9. The apparatus of claim 1, wherein the at least one encrypted key further comprises:
   an encrypted second key for decrypting the protected sensitive data.

10. An apparatus for a network function service producer, the apparatus comprising:
    at least one processor; and
    at least one memory storing instructions that, when executed by the at least one processor, cause the apparatus at least to:
    protect sensitive data using at least one key to form protected sensitive data, wherein the sensitive data comprises a machine learning model, and wherein the at least one key comprises an encrypted first key for integrity verification of the protected sensitive data;
    register the protected sensitive data at a first repository function; and
    provide the at least one key to a network function.

11. The apparatus of claim 10, wherein the providing the at least one key to a network function comprises:
    provide the at least one key to a network repository function.

12. The apparatus of claim 10, wherein the providing the at least one key to a network function comprises:
    receive a request for the at least one key from a network function service consumer;
    encrypt the at least one key using a public key associated with the network function service consumer to form at least one encrypted key; and
    provide the at least one encrypted key to the network function service consumer.

13. The apparatus of claim 10, wherein the request for the at least one key comprises the public key or an indication of where to obtain the public key.

14. The apparatus of claim 13, wherein the indication of where to obtain the public key comprises an indication of one of the following:
- from a transport layer security, TLS, certificate; or
- from a client credentials assertion, CCA.

15. The apparatus of claim 10, wherein the at least one key further comprises:
- an encrypted second key for decrypting the protected sensitive data.

16. The apparatus of claim 10, wherein the at least one memory and the instructions are configured to, with the at least one processor, further cause the apparatus to:
- register a profile for the network function service producer at a network repository function, wherein the profile comprises an indication that the network function service producer is able to provide the at least one key to the network function.

17. An apparatus for a network repository function, the apparatus comprising:
- at least one processor; and
- at least one memory storing instructions that, when executed by the at least one processor, cause the apparatus at least to:
- store profile information for a first network function service producer, wherein the profile comprises an indication that the first network function service producer is able to provide at least one first key associated with verifying and/or decrypting a first protected sensitive data to another network function, wherein the first sensitive data comprises a machine learning model;
- receive, from a first network function service consumer, a request for a first access token for enabling the first network function service consumer to obtain the at least one first key;
- provide the first network function service consumer with the requested access token;
- receive, from a second network function service producer, at least one second key associated with verifying and/or decrypting a second protected sensitive data, wherein the at least one second key comprises an encrypted key for integrity verification of the protected sensitive data; and
- receive, from a second network function service consumer, a request for a second access token for accessing the second protected sensitive data, wherein
- the request for the second access token comprises an indication that the second network function service consumer is configured to decrypt and/or verify protected sensitive data, and either a public key or an indication of where to obtain the public key; and wherein
- the public key is a public key of the second network function service consumer;
- encrypt the at least one second key using the public key to form at least one encrypted second key; and
- provide the at least one encrypted second key to the network function service consumer.

18. The apparatus of claim 17, wherein the at least one encrypted second key is provided as part of an access token claim in response to the request for the access token.

19. The apparatus of claim 17, wherein the at least one second key further comprises an encrypted key for decrypting the protected sensitive data.

* * * * *